US008305527B2

(12) United States Patent
Lee et al.

(10) Patent No.: US 8,305,527 B2
(45) Date of Patent: Nov. 6, 2012

(54) COLOR SEPARATION SYSTEM

(75) Inventors: Chi-Hung Lee, Hsinchu County (TW);
Hui-Hsiung Lin, Hsinchu County (TW);
Jen-Hui Tsai, Hsinchu (TW); Yu-Nan Pao, Hsinchu County (TW); Chin-Ju Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 329 days.

(21) Appl. No.: 12/781,538

(22) Filed: May 17, 2010

(65) Prior Publication Data
US 2011/0141412 A1    Jun. 16, 2011

(30) Foreign Application Priority Data
Dec. 10, 2009  (TW) .............................. 98142249 A

(51) Int. Cl.
*G02F 1/1335* (2006.01)
(52) U.S. Cl. ........ 349/106; 349/108; 349/113; 349/193; 349/201
(58) Field of Classification Search .................. 349/104, 349/105, 106, 108, 113, 116, 112, 193, 201, 349/202; 362/97.1, 97.2, 97.3, 97.4
See application file for complete search history.

(56) References Cited

U.S. PATENT DOCUMENTS

| 4,807,978 | A   | 2/1989  | Grinberg et al. |       |
|-----------|-----|---------|-----------------|-------|
| 5,615,024 | A   | 3/1997  | May et al.      |       |
| 5,764,389 | A   | 6/1998  | Grinberg et al. |       |
| 6,600,528 | B2* | 7/2003  | Colgan et al.   | 349/95 |
| 7,164,454 | B2  | 1/2007  | Numata et al.   |       |
| 7,580,083 | B2  | 8/2009  | Jung            |       |
| 2002/0075427 | A1* | 6/2002 | Colgan et al. | 349/95 |
| 2005/0001975 | A1* | 1/2005 | Ishihara et al. | 349/201 |
| 2010/0165464 | A1* | 7/2010 | Lin et al. | 359/570 |
| 2011/0141412 | A1* | 6/2011 | Lee et al. | 349/106 |
| 2011/0242457 | A1* | 10/2011 | Lee et al. | 349/63 |

FOREIGN PATENT DOCUMENTS

| CN | 1920642 | 2/2007 |
| CN | 101482630 | 7/2009 |
| TW | M249217 | 11/2004 |

OTHER PUBLICATIONS

Roberto Caputo, Luciano De Sio, Martin J.J. Jak, Eefje J. Homix, Dick K.G. de Boer and Hugo J. Corenlissen, "Short Period Holographic Structures for Backlight Display Applications", Philips Research Europe, High Tech Campus 34, 5656AE Eindhoven, The Netherlands, Optics Exp. vol. 15, No. 17, Aug. 2007.
F. Yamada, S. Ono, and Y. Taira, "19-1: Dual Layered Very Thin Flat Surface Micro Prism Array Directly Molded in an LCD Cell" Tokyo Research Laboratory, IBM Research, Shimotsuruma, Yamato, Kanagawa, Japan, EURODISPLAY 2002.
China Patent Office Action issued on Aug. 3, 2012.

* cited by examiner

*Primary Examiner* — Brian Healy
(74) *Attorney, Agent, or Firm* — WPAT PC; Justin King

(57) ABSTRACT

A color separation system is disclosed, which comprises: a backlight source, being highly collimated and used for providing an incident beam; a color separation module, formed with a first color separation film for separating the incident beam basing on wavelength while deflecting the optical paths of the resulting split beams; and a beam splitting module, being configured with at least one beam splitting plate and a liquid crystal layer; wherein, the at least one beam splitting plate is used for converging the beams from the color separation module while deflecting the optical paths thereof for enabling those to be discharged thereout following a normal direction of a light emitting surface of the backlight source.

18 Claims, 7 Drawing Sheets

COLOR SEPARATION SYSTEM

TECHNICAL FIELD

The present disclosure relates to a color separation system, and more particularly, to a color separation system capable of acting in replacement of the conventional color filters (CF) used in optical devices, such as display panels, image sensors and color camcorders, for its simplicity and high optical efficiency.

TECHNICAL BACKGROUND

In a flat display, a backlight source is often used in combination with a spatial light modulator and a color filter to present full-color images. In an image sensor of a digital camera, a color filter is also used in combination with color difference calculation to reproduce the color of an original object. In larger systems such as a color video camera or a back projection TV, a three-plate or two-plate prism set or a color filter is used in combination with a collimated light source to present full-color images. When the color filter is used in such systems, because each shading pixel can only present a single primary color of the RGB three primary colors, about two-thirds of energy of the incident white light is absorbed, thus decreasing the efficiency of using the light and shortening the lifespan of the battery. In addition, fabrication of the color filter can be rather complex and more than one semiconductor photolithography processes are needed for each primary color, which results in a high cost.

Please refer to FIG. 1 to FIG. 3, which show a common light separation architecture used in conventional color camcorders. There are three types of light separation architectures, which are a three-plate prism-type optical system composed of a zoom lens 1, an infrared filter 2, a three-plate prism 3, a red light charge-coupled device (CCD) 4, a green light CCD 5, and a blue light CCD 6, as shown in FIG. 1; a two-plate dichroic prism-type optical system composed of a zoom lens 1, an infrared filter 2, a two-plate prism 7, a red-blue filter 8, a red-blue light CCD 9, a green light CCD 5, as shown in FIG. 2; and an optical system with single-plate color filter composed of a zoom lens 1, an infrared filter 2, a red-green-blue filter 10 and a red-green-blue light CCD 11, as shown in FIG. 3. Among which, both the optical systems shown in FIG. 1 and FIG. 2, that are designed to achieve light separation by the use of their prisms and optical interference films, are disadvantageous in their bulky sizes and complex structures with plenty of optical elements required. However, the optical structure shown in FIG. 3, which directly uses a color filter for light separation, can be suffered by its low optical efficiency.

Therefore, researchers all over the world are working tirelessly to come up with all kinds of new techniques for overcoming the aforesaid shortages. One such study is disclosed in a paper published in Journal of SID 16/8, 2008, by Philips Co., and also in a paper published in EURODISPLAY 2002, pages 339~342, by IBM, both of which use a sub-wavelength structure for splitting an incident beam into multiple beams of various colors and then enable the resulting beams to be focused on their corresponding sub-pixels by the use of a micro-lens array, so that cooperatively are capable of working as a substitute for the conventional dye photoresist. However, they both suffer the following shortcomings:

(1) it is not a easy task for producing a large-area sub-wavelength structure whose pitch is about 320 nm;
(2) the resulting light emitting thereby has poor uniformity;
(3) high production cost.

Moreover, in U.S. Pat. No. 5,615,024A, entitled "Color Display Device with Chirped Diffraction Gratings", a blazed diffraction grating capable of acting in replacement of color filters for separating an incident beam into beams of primary colors is disclosed, in which the resulting beams are primarily first order diffraction beams. Accordingly, when the aforesaid structure is applied in display panels, the beam of one primary color should be directed to correspond to one pixel. However, by the usage of the first order diffraction beams, a large included angle will be formed between its incident beam and emitting beam so that the incident beam must be directed to enter the blazed grating by a larger angle so as to enable the resulting emitting beam to enter its liquid crystal layer following the normal of the same. On the other hand, if the incident beam enter the blazed grating perpendicularly, it will result the emitting beam to enter the liquid crystal layer in a large angle which will require to have additional refraction elements for correcting the deviation, otherwise, it can not be applied in thin display panels.

In U.S. Pat. No. 4,807,978, entitled "Color Display Device and Method Using Holographic Lenses", a holographic lens set capable of acting in replacement of color filters for separating an incident beam into beams of primary colors is disclosed, in which the resulting beams are primarily first order diffraction beams. Accordingly, when the aforesaid structure is applied in display panels, the beam of one primary color should be designed to correspond to one pixel. As the color separation in the aforesaid U.S. patent requires the holographic lens set to be composed of three layers of holographic lenses, not only it is extremely difficult to fabricate, but also it is difficult to align the lens arrays precisely with respect to each other. In addition, as there is severe cross talk between the resulting beams of three primary colors, the use of such holographic lenses in color display device will suffer high noise.

In U.S. Pat. No. 5,764,389, entitled "Holographic Color Filters for Display Applications, and Operating Method", a holographic set capable of acting in replacement of color filters for separating an incident beam into beams of primary colors is disclosed, in which first an incident beam is separated into beams of different spectral regions corresponding to the three primary colors by the use of a holographic color filter, and then another holographic color filter is used for deflecting the optical paths of the resulting beams in a manner that the beam of one primary color is directed to correspond to one pixel. Similarly, since there are multiple layers of holographic color filters used for achieving the color separation, not only the optical efficiency is poor, but also it is difficult to align the holographic color filters precisely with respect to each other.

In the image sensor disclosed in TW Pat. No. M249217, a set of lenses is used in cooperation with a prism set, as a substitute to color filters, for separating an incident beam into beams of primary colors while deflecting the optical paths of the resulting beams in a manner that the beam of one primary color is directed to correspond to one pixel. As the lens set is disposed on the prism set and the shape of the prism is comparatively unsymmetrical with respect to the optical field of the image sensor, it is practically infeasible despite of its good optical efficiency.

Therefore, it is in need of a color separation system capable of acting in replacement of the conventional color filters for its simplicity and high optical efficiency. In addition, the color separation system should be able to separating an incident beam into a red, a green and a blue light beam that are directed to enter a liquid crystal layer of a display panel in a vertical manner with satisfactory optical efficiency.

TECHNICAL SUMMARY

Accordingly, the present disclosure is directed to a color separation system capable of acting in replacement of the conventional color filters used in optical devices, such as display panels, image sensors and color camcorders, for its simplicity and high optical efficiency.

The present disclosure provides a color separation system, which comprises: a backlight source, being highly collimated and used for providing an incident beam; a color separation module, formed with a first color separation film configured with a first light incident surface and a first light emergence surface; and a beam splitting module, being configured with at least one beam splitting plate and a liquid crystal layer; wherein, the first light incident surface, being configured with periodic light-splitting microstructures, is provided for separating the incident beam basing on the difference in wavelengths; and the first light emergence surface, being configured with periodic polygon structures, is used for receiving the incident beam passing through the light incident surface while deflecting the optical paths of the resulting split beams for enabling the same to travel in a normal direction of a light emitting surface of the backlight source; and the at least one beam splitting plate, each having a periodic microstructures formed thereon, is used for converging the beams from the color separation module while directing the optical paths thereof toward the liquid crystal layer in positions respectively corresponding with multiple sub-pixels thereof, and thereafter, enabling those to be discharged thereout in a direction parallel with the normal direction.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

It is noted that the terms such as the first, the second, or the third, etc., are used only for clarity and thus distinguishing one element from the other, but not for specifying orders or a particular element.

Figure 1:
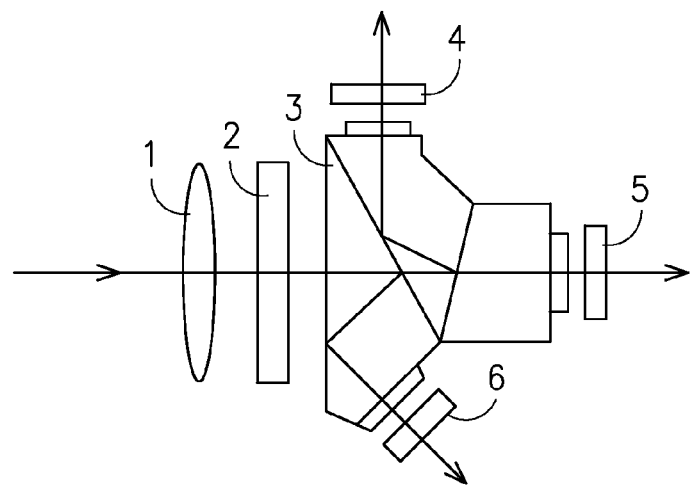
FIG. 1 is a schematic diagram showing a conventional three-plate prism-type optical system.
Figure 2:
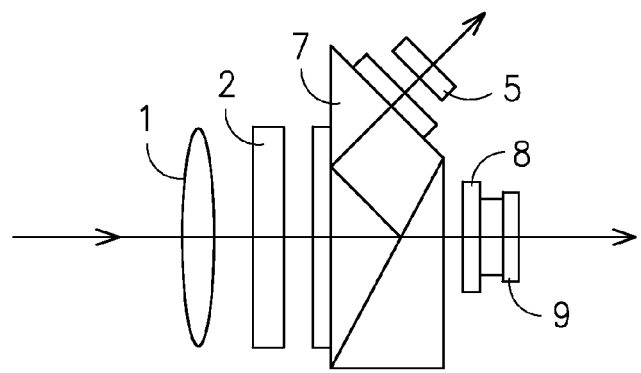
FIG. 2 is a schematic diagram showing a conventional two-plate dichroic prism-type optical system.
Figure 3:
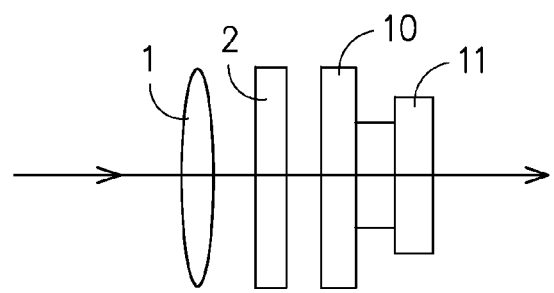
FIG. 3 is a schematic diagram showing a conventional optical system with single-plate color filter.
Figure 4:
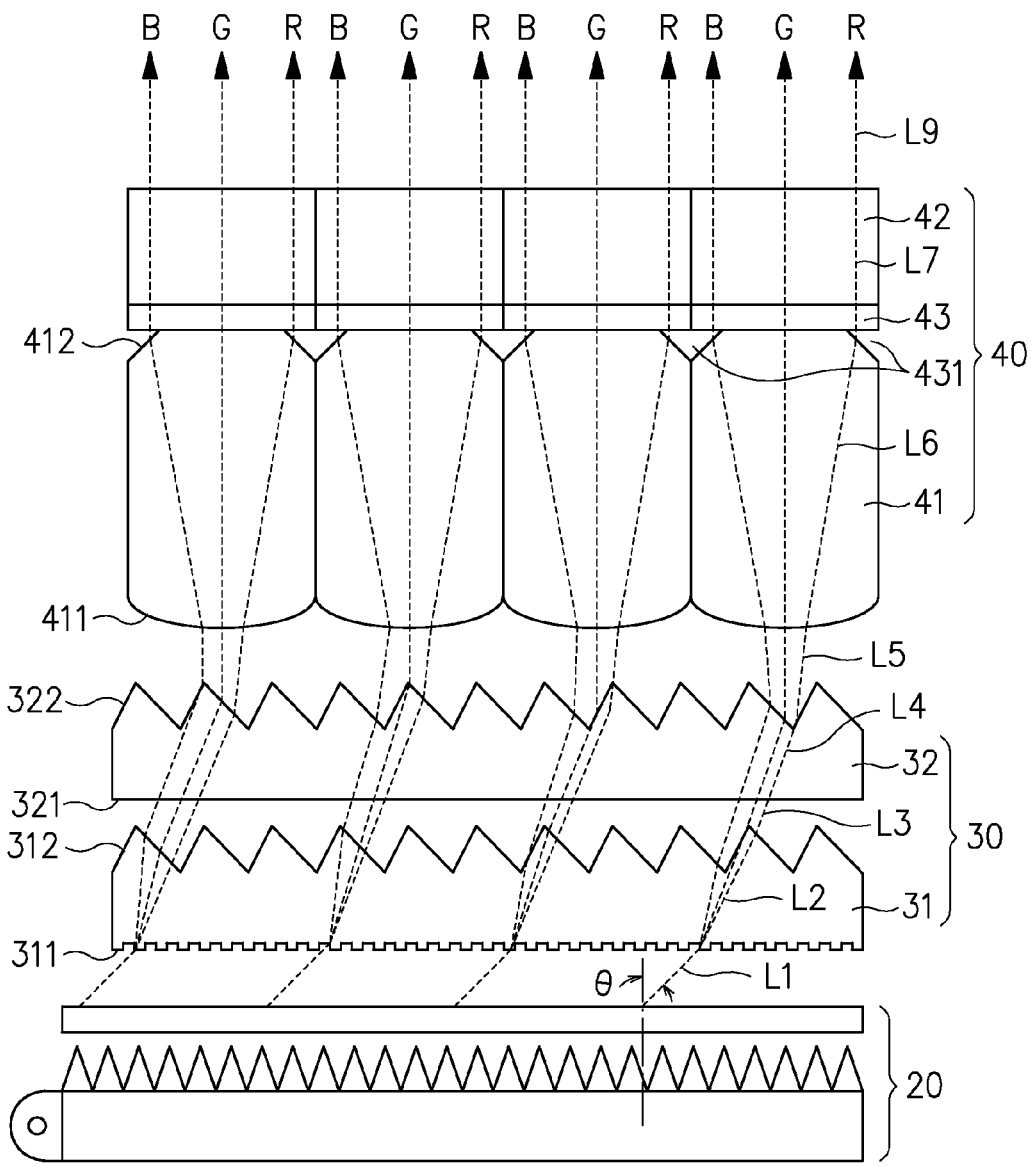
FIG. 4 is a schematic diagram showing a color separation system according to a first embodiment of the present disclosure.

Please refer to FIG. 4, which is a schematic diagram showing a color separation system according to a first embodiment of the present disclosure. In FIG. 4, the color separation system is comprised of a highly collimated backlight source 20, a color separation module 30, and a beam splitting module 40. The backlight source 20 is used for providing an oblique incident beam L1, whereas the incident beam L1 of the backlight source 20 is being collimated by enabling the divergence angle thereof to lower than 10 degrees FWHM (full width at half-maximum) with an oblique incident angle θ ranged from 0° to 50° with respect to the normal direction. The color separation module 30 includes a first color separation film 31 and a second first color separation film 32, in that the refractive indexes of the two color separation films 31, 32 are both ranged between 1.35 and 1.65. Moreover, the first color separation film 31 is configured with a first light incident surface 311 and a first light emergence surface 312, in which the first light incident surface 311 is formed with periodic light-splitting microstructures and the first light emergence surface 312 is formed with periodic deflective polygon microstructures. In an exemplary embodiment, the period of the light-splitting microstructures formed on the first light incident surface 311 is ranged between 2 μm and 5 μm; and the period of the polygon microstructures formed on the first light emergence surface 312 is ranged between 10 μm and 150 μm. It is noted that the period here is referred to the distance between the centers of two adjacent microstructures. Thereby, as the incident beam L1 from the backlight source 20 is directed to travel passing through the first light incident surface 311, the incident beam L1 will be separated basing on the difference in wavelengths into a plurality of secondary incident beams L2, i.e. the diffraction beams that are directed toward the first light emergence surface 312 whereby the optical paths of those second incident beams L2 are deflected before being discharged out of the first color separation film 31 as tertiary incident beams L3 in correspondence. The arrangement of the first light emergence surface 312 is to deflect the secondary incident beams L2 for enabling the same to travel following a normal direction of the first color separation film 31, i.e. for deflecting the optical paths of the secondary incident beams L2 so as to direct the same to be discharged out of the backlight source 20 in directions parallel with the normal of a light emitting surface of the backlight source 20. The second color separation film 32 is configured with a planar second light incident surface 321 and a second light emergence surface 322 having periodic deflective microstructures formed therein, in which the periodic deflective microstructures are periodic polygon microstructures formed with a period ranged between 10 μm and 150 μm. As shown in FIG. 4, each tertiary incident beams L3 entering the second color separation film 32 through the second light incident surface 321 is transformed into a corresponding quaternary incident beam L4 while being directed to travel toward the second light emergence surface 322 where the optical path thereof is deflected for enabling the traveling of the same to follow the normal of the light emitting surface of the backlight source 20 before being discharged out of the second color separation film 32, by that a corresponding quinary incident beam L5 is achieved. The arrangement of the second light emergence surface 322 is to deflect the quaternary incident beams L4 for enabling the same to travel following a normal direction of the second color separation film 32, i.e. for deflecting the optical paths of the quaternary incident beams L4 so as to direct the same to be discharged out of the backlight source 20 in directions parallel with the normal of the light emitting surface of the backlight source 20. Therefore, each incident beam L1 after being deflected twice respectively by the first light emergence surface 312 and the second light emergence surface 322 is going to travel in a direction about parallel with the normal of the color separation module 30, i.e. the normal of the light emitting surface of the backlight source 20.

It is noted that either the first color separation film 31 or the second color separation film 32 can be made of a material of any refractive index. In addition, no matter the refractive index of the first color separation film 31 is larger than, equal to, or smaller than that of the second color separation film 32, the optical path of the incident beam can be deflected by the cooperation of the first color separation film 31 and the second color separation film 32 for enabling the same to travel in a direction about parallel with the normal of the color separation module 30, i.e. the normal of the light emitting surface of the backlight source 20.

The beam splitting module 40 includes a first beam splitting plate 41 and a liquid crystal layer 42, in which the first beam splitting plate 41, being configured with periodic microstructures, is used for converging the beams from the color separation module 30 while directing the optical paths thereof toward the liquid crystal layer 42 in positions respectively corresponding with multiple sub-pixels thereof, and thereafter, enabling those to be discharged thereout in a direction parallel with the normal of the light emitting surface of the backlight source 20. In this embodiment, the refractive index of the first beam splitting plate 41 is ranged between 1.35 and 1.65. Moreover, the first beam splitting plate 41 is configured with a third light incident surface 411 and a third light emergence surface 412. There are periodic refractive microstructures formed on the third light incident surface 411 in a period ranged between 60 μm and 500 μm, whereas each refractive microstructure can be a spherical microstructure or a non-spherical microstructure. It is noted that the non-spherical refractive microstructure is substantially an arc surface formed without constant curvature that is different from the spherical microstructure. There are periodic deflective microstructures formed on the third light emergence surface 412 in a period ranged between 60 μm and 500 μm, whereas each deflective microstructure can be a polygon microstructure. Thereby, as the quinary incident beam L5 from the color separation module 30 is directed to travel passing through the third light incident surface 411, the quinary incident beam L5 will be converged and transformed into corresponding senary incident beams L6 inside the first beam splitting plate 41, and then the senary incident beams L6 are directed toward the third light emergence surface 412 whereby the optical paths of those senary incident beams L6 are deflected before being discharged out of the first beam splitting plate 41 as septenary incident beams L7 in correspondence that are traveling in directions parallel with the normal of the light emitting surface of the backlight source 20 while being directed entering the liquid crystal layer 42. As soon as the septenary incident beams L7 enter the liquid crystal layer 42, they are converged thereby basing upon the difference in wavelength or in incident angle in positions respectively corresponding with multiple sub-pixels of the liquid crystal layer 42. That is, by the deflection of the third light emergence surface 412, the beams converged by the third light incident surface 411 are enabled to travel in directions parallel to the normal of the first beam splitting plate 41 before entering the liquid crystal layer 42, where they are being separated in colors, such as the R, G, B primary colors, and thus being transformed into the nonary incident beams L9 that are discharged out of the liquid crystal layer 42 in directions parallel with the normal of the light emitting surface of the backlight source 20, as shown in FIG. 4. Moreover, there is a transparent adhesive material, being a dry adhesive material of refractive index ranged between 1.43 and 1.62 and formed with a thickness smaller than 200 μm that is sandwiched between the first beam splitting plate 41 and the liquid crystal layer 42 for integrating the two. In this embodiment, there are gaps 431 sandwiched between the adhesive material 43 and the first beam splitting plate 41 as each gap 431 is formed in a manner selected from the group consisting of: the gap 431 is vacuumed, the gap 431 is filled with air, and the combination thereof. It is noted that the gap 431 filled with air is considered as a material whose refractive index is 1. When the gaps 431 formed between the adhesive material 43 and the first beam splitting plate 41 are filled with a material whose refractive index is smaller than that of the first beam splitting plate 41, it will cause the beams traveling therethrough to be deflected toward the normal of the light emitting surface of the backlight source 20. Similarly, there is no restriction relating to the refractive index of the adhesive material 43. In another embodiment that when the adhesive material 43 is tightly engaged with the first beam splitting plate 41 without causing any gap to be formed therebetween, the adhesive material 43 should be selected from adhesive materials whose refractive indexes are not larger than (smaller than or equal to) that of the first beam splitting plate 41 so as to enable the senary incident beams L6 to be deflected toward the normal of the light emitting surface of the backlight source 20.

Figure 5:
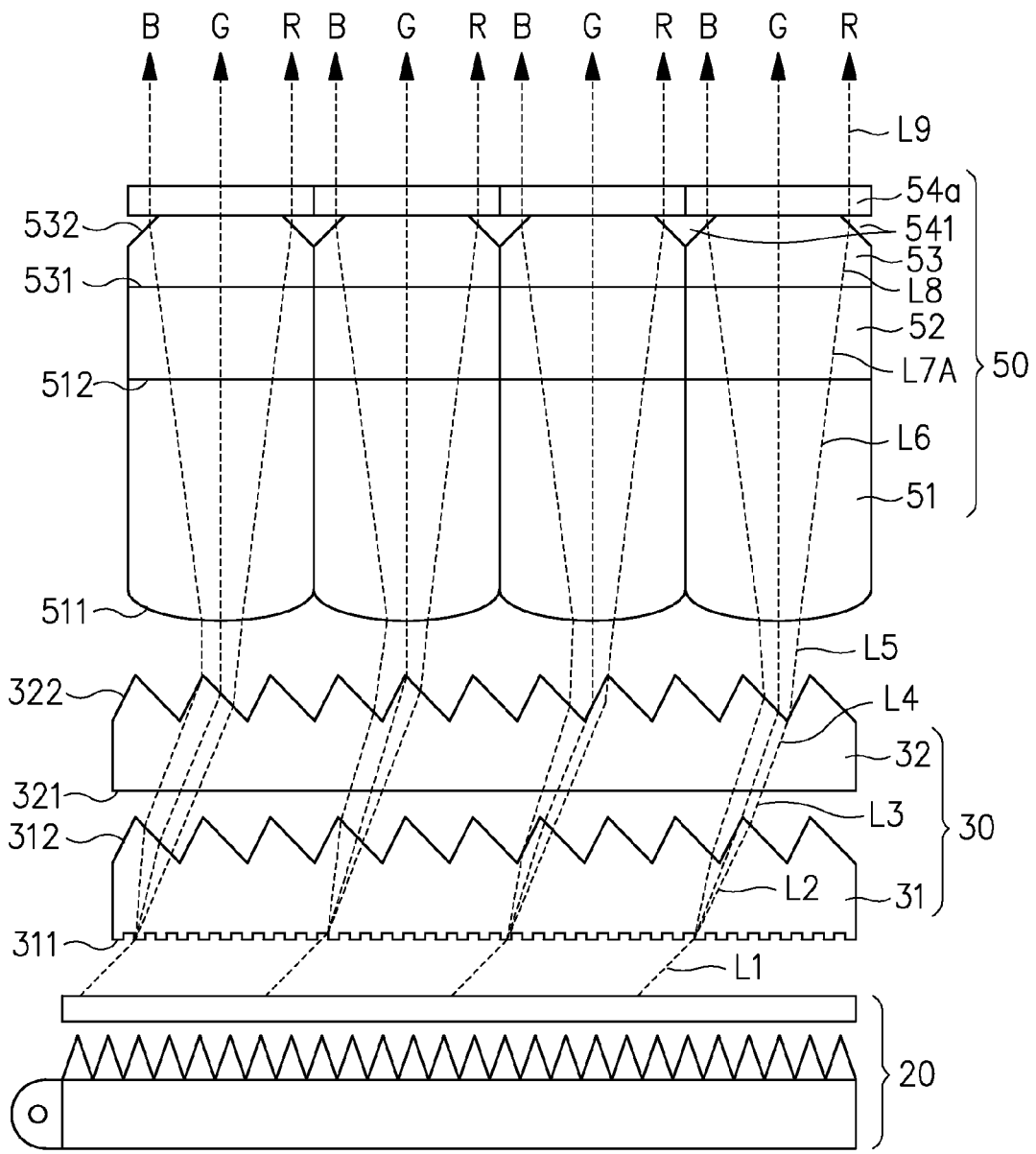
FIG. 5 is a schematic diagram showing a color separation system according to a second embodiment of the present disclosure.

Please refer to FIG. 5, which is a schematic diagram showing a color separation system according to a second embodiment of the present disclosure. In FIG. 5, the color separation system is comprised of a highly collimated backlight source 20, a color separation module 30, and a beam splitting module 50, in which the backlight source 20 and the color separation module 30 are structured the same as those disclosed in FIG. 4 and thus will not be described further herein. The difference between the second embodiment and the first embodiment is that: the beam splitting module 50 includes: a second beam splitting plate 51, configured with a fourth light incident surface 511 and a planar fourth light emergence surface 512; a liquid crystal layer 52; and a third beam splitting plate 53, configured with a planar fifth light incident surface 531 and a fifth light emergence surface 532, in which the refractive indexes of the second and the third beam splitting plates 51, 53 are ranged between 1.35 and 1.65; and the fourth light incident surface 511 is configured with periodic refractive microstructures in a period ranged between n 60 μm and 500 μm whereas each refractive microstructure can be a spherical microstructure or a non-spherical microstructure; and the fifth light emergence surface 532 is configured with periodic deflective microstructures in a period ranged between 60 μm and 500 μm whereas each deflective microstructure can be a polygon microstructure. Thereby, as the quinary incident beam L5 from the color separation module 30 is directed to travel passing through the fourth light incident surface 511, the quinary incident beam L5 will be converged and transformed into corresponding senary incident beams L6 inside the second beam splitting plate 51, and then the senary incident beams L6 are directed toward the fourth light emergence surface 512 and then enter the liquid crystal layer 52 whereby they are converged basing upon the difference in wavelength or in incident angle in positions respectively corresponding with multiple sub-pixels of the liquid crystal layer 52 and thus forming septenary incident beams L7A. The septenary incident beams L7A is directed to travel passing the fifth light incident surface 531 so as to be transformed into octonary incident beams L8 that are guided to the fifth light emergence surface 532 where the optical paths thereof are deflected for enabling the same to travel in directions parallel to the normal of the light emitting surface of backlight source 20 as the incident beams L9 that are discharging out of the third beam splitting plate 53. Moreover, there is a transparent adhesive material 54a coated on the fifth light emergence surface 532 that is provided for the incident beam L9 to travel passing therethrough after being deflected by the fifth light emergence surface 532. It is noted that the adhesive material 54a can be a dry adhesive or a wet adhesive, but in this embodiment, the adhesive material 54a shown in FIG. 5 is a flat dry adhesive. In this embodiment, there are gaps 541 sandwiched between the adhesive material 54a and the fifth light emergence surface 532 as each gap 541 is formed in a manner selected from the group consisting of: the gap 541 is vacuumed, the gap 541 is filled with air, and the combination thereof. It is noted that the gap 541 filled with air is considered as a material whose refractive index is 1. In addition, the refractive index of the adhesive material 54a should be ranged between 4.13 and 1.62, while being formed with a thickness smaller than 200 μm. When the gaps 541 formed between the adhesive material 54a and the fifth light emergence surface 532 are filled with a material whose refractive index is smaller than that of the third beam splitting plate 53, it will cause the beams traveling therethrough to be deflected toward the normal of the light emitting surface of the backlight source 20. Similarly, there is no restriction relating to the refractive index of the adhesive material 54a.

Figure 6:
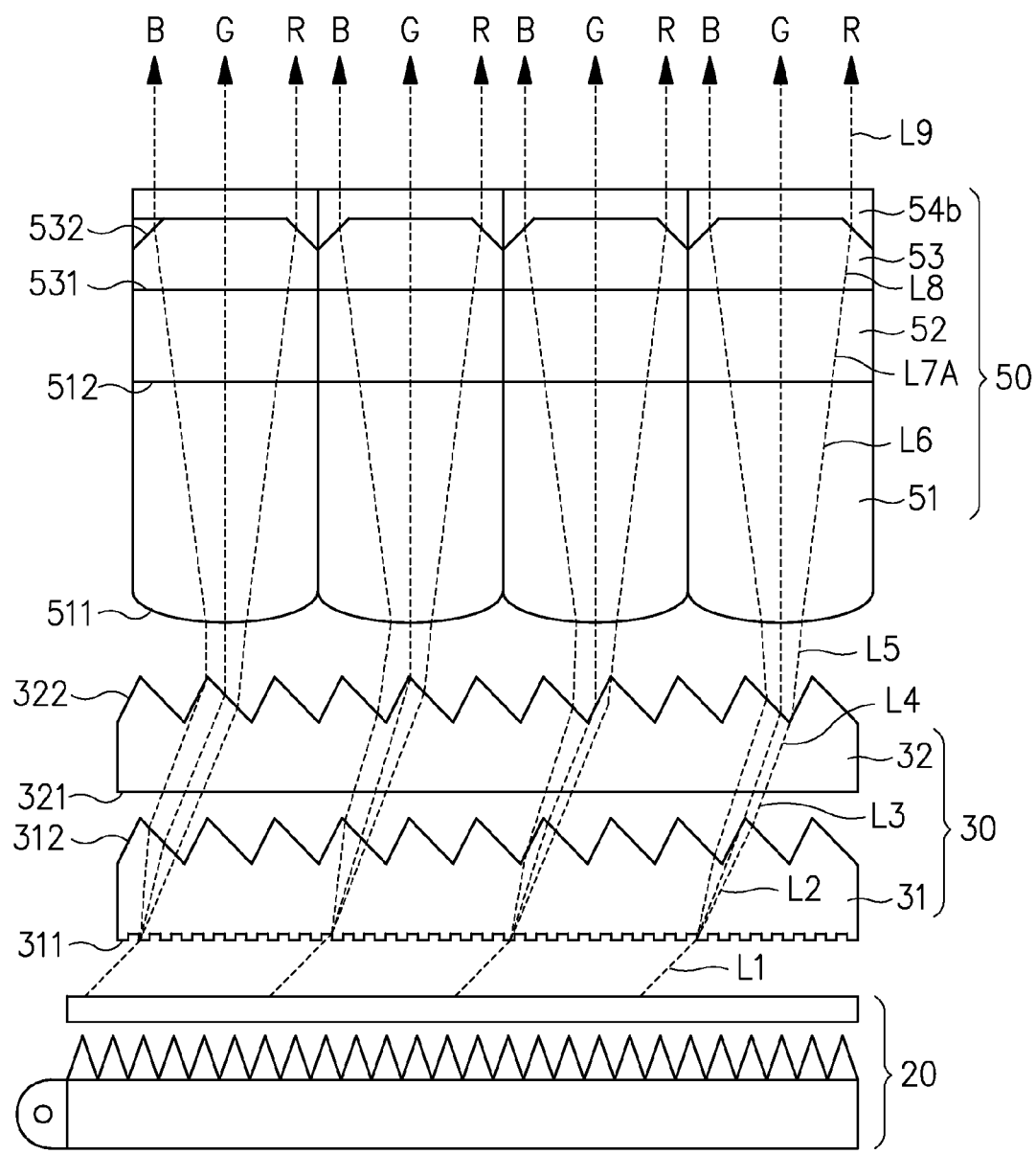
FIG. 6 is a schematic diagram showing a color separation system according to a third embodiment of the present disclosure.

Please refer to FIG. 6, which is a schematic diagram showing a color separation system according to a third embodiment of the present disclosure. The difference between the system shown in FIG. 6 and that shown in FIG. 5 is that: the adhesive material 54b used in the present embodiment is a kind of transparent wet adhesive with a refractive index ranged between 1.43 and 1.62, by that the adhesive 54b can be coated on the fifth light emergence surface 532 without having any gaps to be formed therebetween. Accordingly, one should select an adhesive whose refractive index is no larger than that of the third beam splitting plate 53 to be used as the adhesive material 54b in this embodiment; and the difference between the refractive indexes of the adhesive material 54b and the third beam splitting plate 53 should be within the range of 0.05 to 0.6. By the cooperation of the third beam splitting plate 53 and the adhesive material 54b, the beams L9 can be discharged in direction about parallel to the normal of the color separation module 30, i.e. parallel to the normal of the light emitting surface of the backlight source 20.

Figure 7:
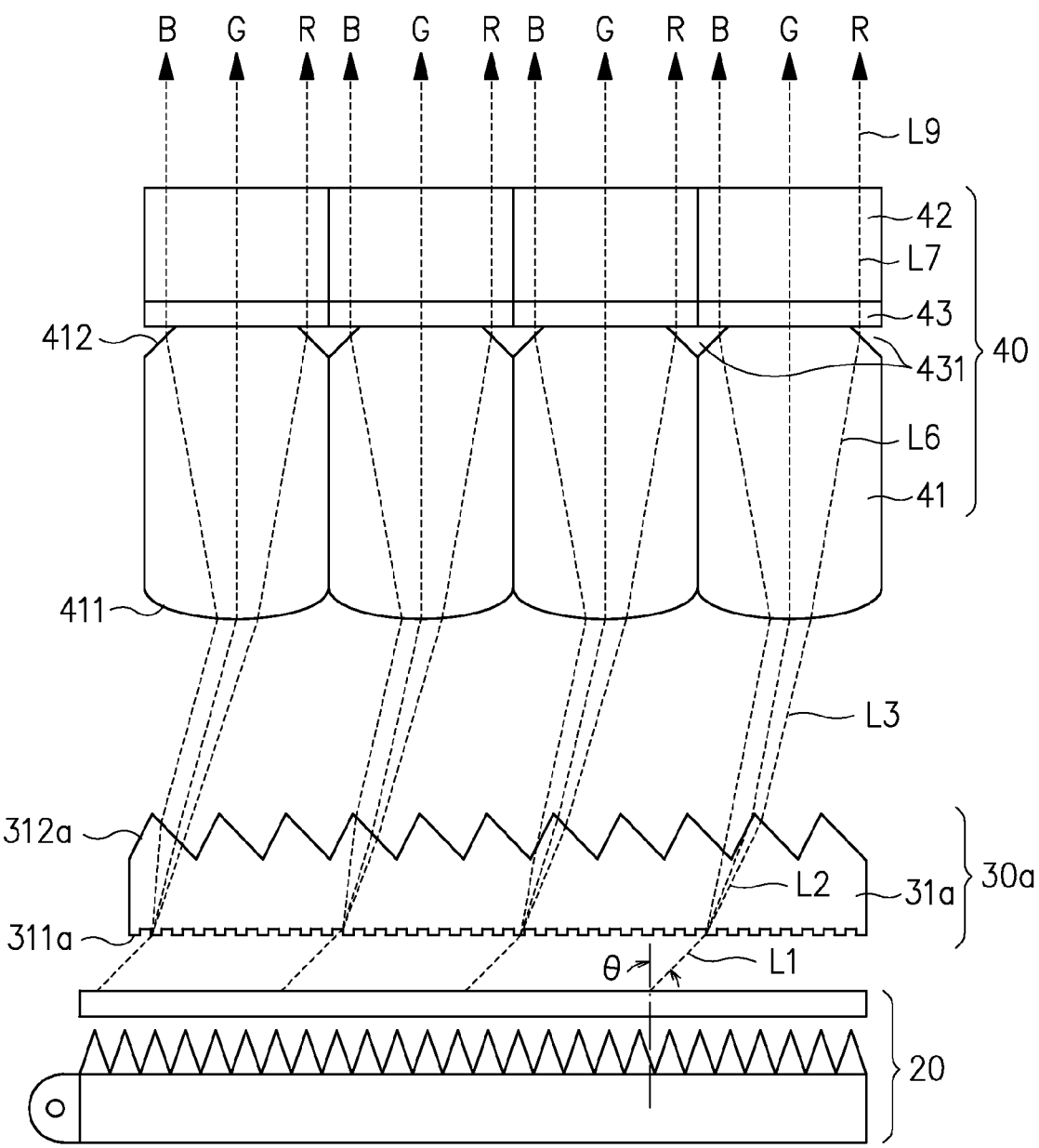
FIG. 7 is a schematic diagram showing a color separation system according to a fourth embodiment of the present disclosure.

Please refer to FIG. 7, which is a schematic diagram showing a color separation system according to a fourth embodiment of the present disclosure. As shown in FIG. 7, the color separation system comprises: a highly collimated backlight source 20, a color separation module 30a and a beam splitting module 40. Accordingly, the present embodiment is characterized in that: there is only one color separation film being disposed in the color separation module 30a, which is the first color separation film 31a shown in FIG. 7. Operationally, as the incident beam L1 from the backlight source 20 is directed to travel passing through the first incident surface 311a, the incident beam L1 will be separated basing on the difference in wavelengths into a plurality of secondary incident beams L2, i.e. the diffraction beams that are directed toward the first light emergence surface 312a whereby the optical paths of those second incident beams L2 are deflected before being discharged out of the first color separation film 31a as tertiary incident beams L3 in correspondence. The arrangement of the first light emergence surface 312a is to deflect the secondary incident beams L2 for enabling the same to travel following a normal direction of the first color separation film 31a. By the illustration of the present embodiment, the color separation module used in the present disclosure can have one or two color separation films, but is not limited thereby.

Figure 8:
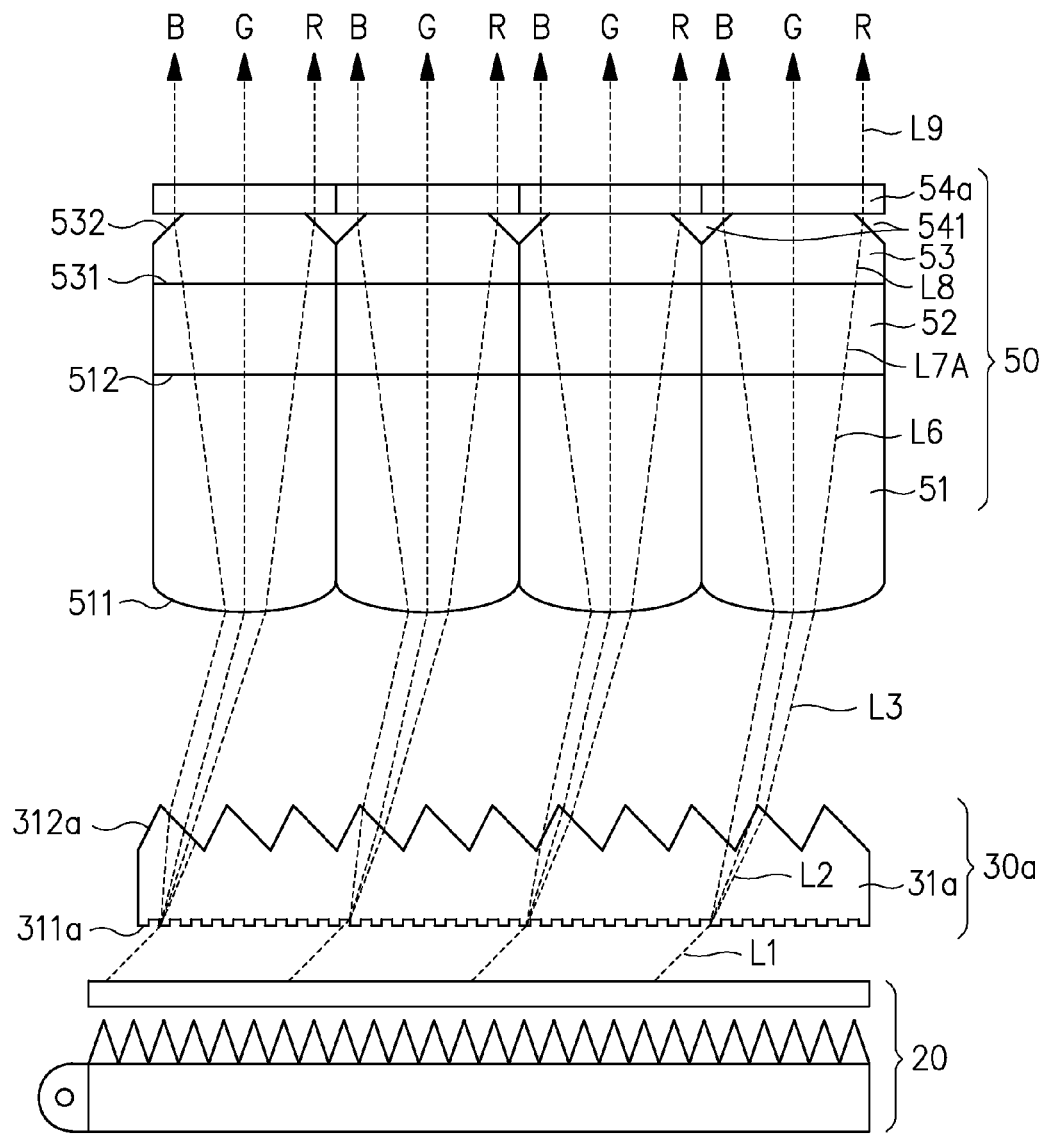
FIG. 8 is a schematic diagram showing a color separation system according to a fifth embodiment of the present disclosure.
Figure 9:
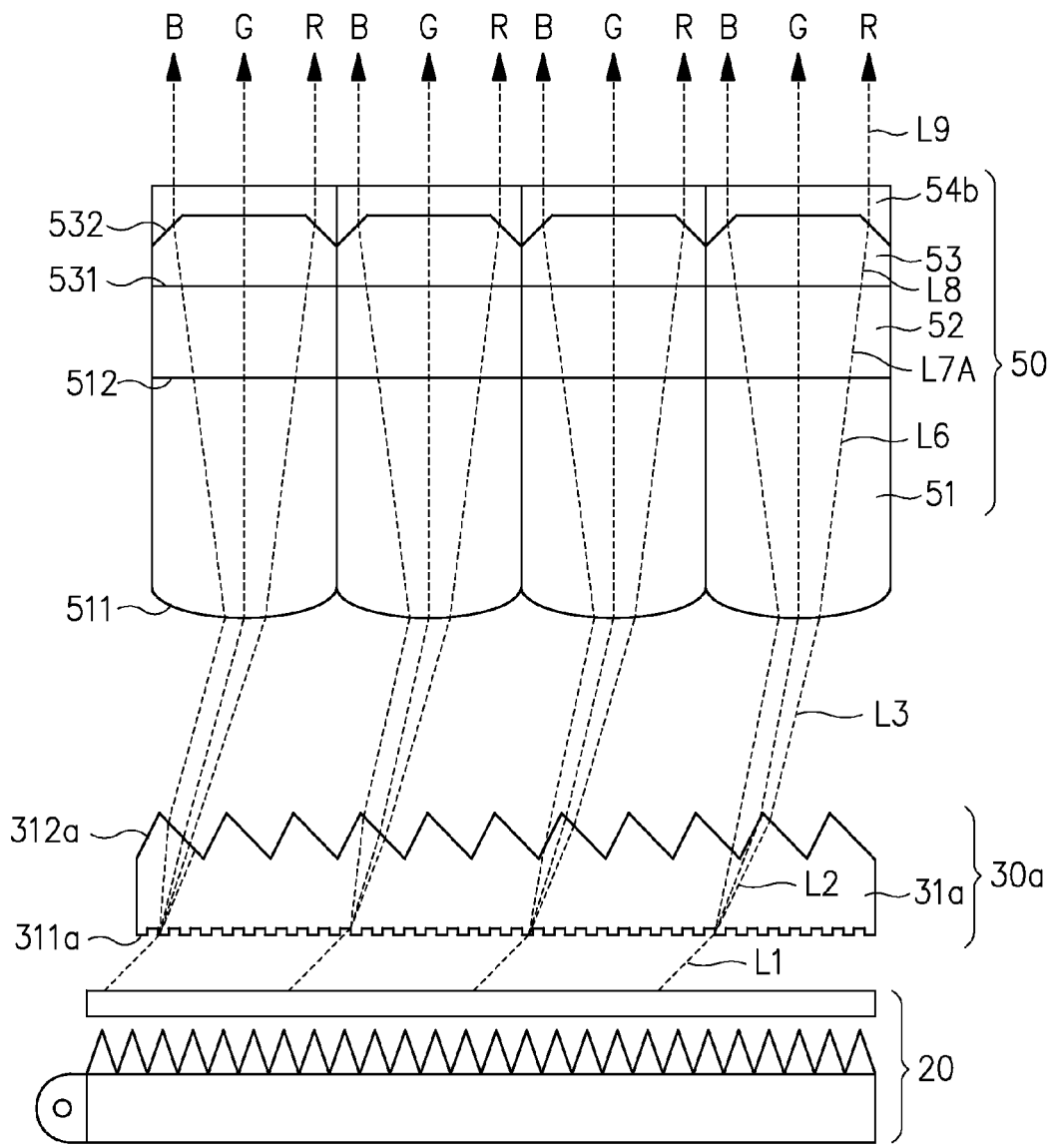
FIG. 9 is a schematic diagram showing a color separation system according to a sixth embodiment of the present disclosure.

Please refer to FIG. 8, which is a schematic diagram showing a color separation system according to a fifth embodiment of the present disclosure. The color separation system shown in this embodiment is substantially the combination of those disclosed in FIG. 5 and FIG. 7. As shown in FIG. 8, the color separation module 30a comprised only one such first color separation film 31a can also be adapted to work in cooperation with the beam splitting module 50 comprised a second beam splitting plate 51, a crystal layer 52 and a third beam splitting plate 53. Similarly, the flat dry transparent adhesive used as the adhesive material 54a in FIG. 8 can be replaced by a transparent wet adhesive 54b as that used in FIG. 6. In FIG. 9, the adhesive material 54b is formed tightly engaging with the third beam splitting plate 53 without causing any gap to be formed therebetween, according to which the adhesive material 54b should be selected from adhesive materials whose refractive indexes are not larger than that of the third beam splitting plate 53 while enabling the difference between the refractive indexes of the adhesive material 54b and the third beam splitting plate 53 to be within the range of 0.05 to 0.6.

Moreover, any color separation system disclosed in the embodiments shown in FIG. 4 to FIG. 9 is capable of working in cooperation with a dual brightness enhancement film (DBRF) and a polarizer for improving light energy usage efficiency.

To sum up, the color separation system provided in the present disclosure is capable of acting in replacement of the conventional color filters used in optical devices, such as display panels, image sensors and color camcorders, for its simplicity and high optical efficiency.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A color separation system, comprising:
   a backlight source, being highly collimated and used for providing an incident beam;
   a color separation module, formed with a first color separation film configured with a first light incident surface and a first light emergence surface; and
   a beam splitting module, being configured with at least one beam splitting plate and a liquid crystal layer;

wherein, the first light incident surface, being configured with periodic light-splitting microstructures, is provided for separating the incident beam basing on the difference in wavelengths; and the first light emergence surface, being configured with periodic polygon microstructures, is used for receiving the incident beam passing through the first light incident surface while deflecting the optical paths of the resulting split beams for enabling the same to travel in a normal direction of a light emitting surface of the backlight source; and the at least one beam splitting plate, each having periodic microstructures formed thereon, is used for converging the beams from the color separation module while directing the optical paths thereof toward the liquid crystal layer in positions respectively corresponding with multiple sub-pixels thereof, and thereafter, enabling those to be discharged thereout in a direction parallel with the normal direction.

2. The color separation system of claim 1, wherein the incident beam of the backlight source is being collimated by enabling the divergence angle thereof to lower than 10 degrees FWHM (full width at half-maximum) with an oblique incident angle ranged from 0° to 50° with respect to the normal direction.

3. The color separation system of claim 1, wherein the refractive index of the first color separation film is ranged between 1.35 and 1.65; the period of the light-splitting microstructures formed on the first light incident surface is ranged between 2 µm and 5 µm; and the period of the polygon microstructures formed on the first light emergence surface is ranged between 10 µm and 150 µm.

4. The color separation system of claim 1, further comprising:
  a second color separation film, including:
    a planar second light incident surface, provided for receiving the incident beam to pass therethrough after the same is being deflected by the first light emergence surface; and
    a second light emergence surface, formed with periodic polygon microstructures, and provided for receiving the incident beam passing through the second light incident surface while deflecting the optical paths of the resulting split beams for enabling the same to travel in the normal direction.

5. The color separation system of claim 4, wherein the refractive index of the second color separation film is ranged between 1.35 and 1.65; and the period of the polygon microstructures formed on the second light emergence surface is ranged between 10 µm and 150 µm.

6. The color separation system of claim 1, wherein the beam splitting module further comprises:
  a first beam splitting plate, having:
    a third light incident surface, configured with periodic refractive microstructures, for converging the beams from the color separation module; and
    a third light emergence surface, configured with periodic deflective microstructures, provided for the beams converged from the third light incident surface to pass therethrough while deflecting the optical paths of the resulting split beams so as to enable the same to travel in the normal direction and thus enter the liquid crystal layer.

7. The color separation system of claim 6, wherein the period of the refractive microstructures formed on the third light incident surface is ranged between 60 µm and 500 µm; and the period of the deflective microstructures formed on the third light emergence surface is ranged between 60 µm and 500 µm.

8. The color separation system of claim 6, wherein the refractive index of the first beam splitting plate is ranged between 1.35 and 1.65.

9. The color separation system of claim 6, wherein the beam splitting module further comprises:
  an adhesive material with refractive index ranged between 1.43 and 1.62, formed with a thickness smaller than 200 µm while being sandwiched between the first beam splitting plate and the liquid crystal layer for integrating the two.

10. The color separation system of claim 9, wherein the refractive index of the adhesive material is not larger than that of the first beam splitting plate.

11. The color separation system of claim 9, wherein there are gap sandwiched between the adhesive material and the first beam splitting plate as each gap is formed in a manner selected from the group consisting of: the gap is vacuumed, the gap is filled with air, and the combination thereof.

12. The color separation system of claim 1, wherein the beam splitting module further comprises:
  a second beam splitting plate, having:
    a fourth light incident surface, configured with periodic refractive microstructures, for converging the beams from the color separation module; and
    a planar fourth light emergence surface, provided for the beams converged from the fourth light incident surface to pass therethrough while directing the same to enter the liquid crystal layer;
  a third beam splitting plate, having
    a planar fifth light incident surface, provided for the beams from the liquid crystal layer to travel passing therethrough; and
    a fifth light emergence surface, configured with periodic deflective microstructures, provided for the beams from the fifth light incident surface to pass therethrough while deflecting the optical paths of the resulting split beams so as to enable the same to travel in a direction parallel with the normal direction.

13. The color separation system of claim 12, wherein the refractive index of the second beam splitting plate is ranged between 1.35 and 1.65; and the period of the refractive microstructures formed on the fourth light emergence surface is ranged between 60 µm and 500 µm.

14. The color separation system of claim 12, wherein the refractive index of the third beam splitting plate is ranged between 1.35 and 1.65; and the period of the deflective microstructures formed on the fifth light emergence surface is ranged between 60 µm and 500 µm.

15. The color separation system of claim 12, wherein there is an adhesive material with refractive index ranged between 1.43 and 1.62 coated on the fifth light emergence surface while being formed with a thickness smaller than 200 µm.

16. The color separation system of claim 15, wherein the refractive index of the adhesive material is not larger than that of the third beam splitting plate.

17. The color separation system of claim 15, wherein there are gaps sandwiched between the adhesive material and the third beam splitting plate as each gap is formed in a manner selected from the group consisting of: the gap is vacuumed, the gap is filled with air, and the combination thereof.

18. The color separation system of claim 16, wherein the difference between the refractive indexes of the third beam splitting plate and the adhesive material is ranged between 0.05 and 0.6.

* * * * *